J. C. GEBHART.
MACHINE FOR MEASURING TEXTILE FABRIC AND COMPUTING THE PRICE THEREOF.
APPLICATION FILED MAR. 17, 1916.
1,250,843.
Patented Dec. 18, 1917.
4 SHEETS—SHEET 1.
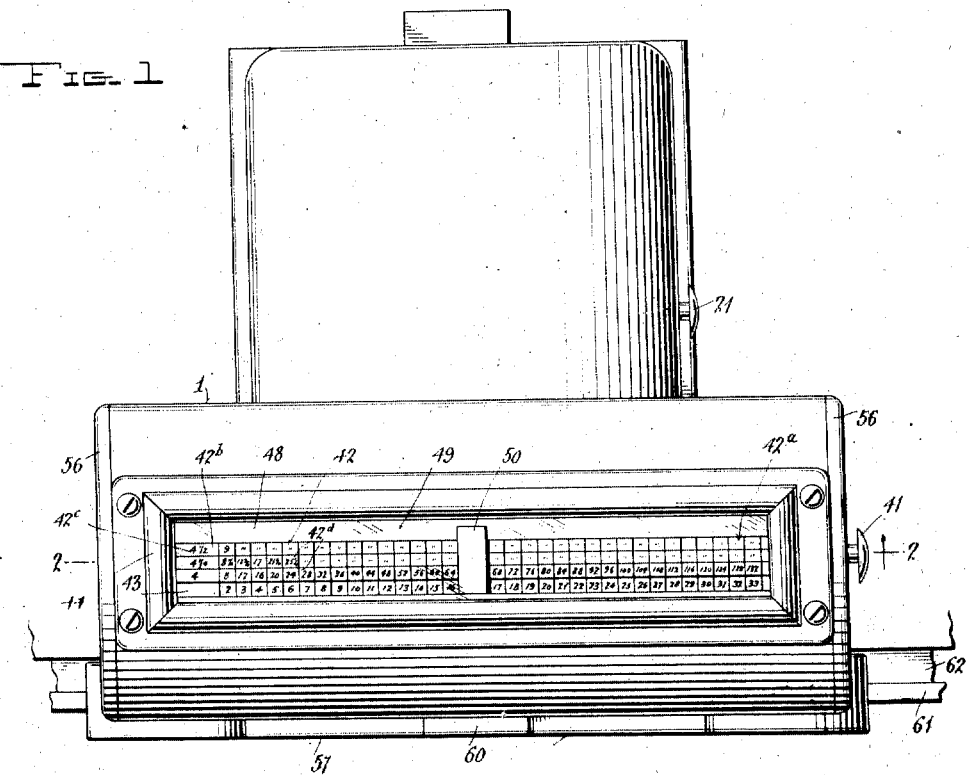
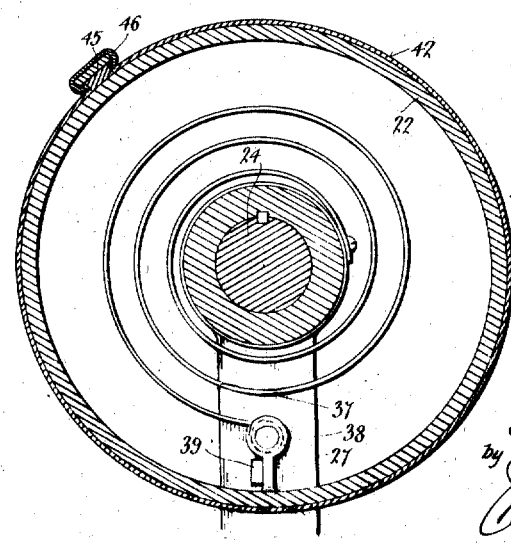
Witnesses
Inventor
John C. Gebhart,
by
Attorney.

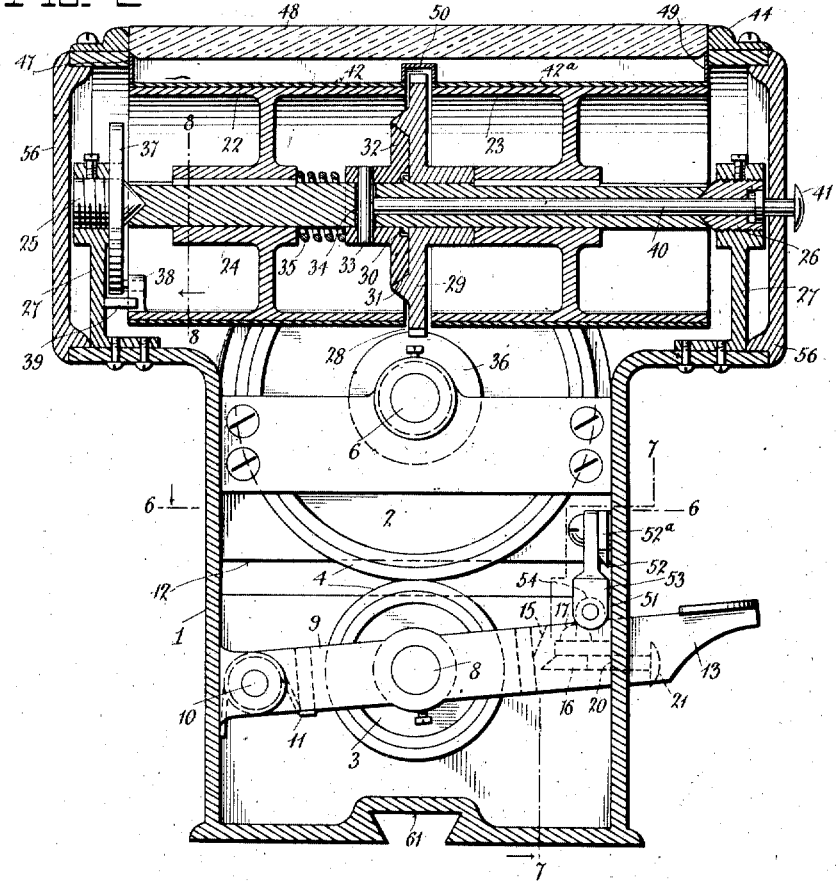

J. C. GEBHART.
MACHINE FOR MEASURING TEXTILE FABRIC AND COMPUTING THE PRICE THEREOF.
APPLICATION FILED MAR. 17, 1916.

1,250,843.

Patented Dec. 18, 1917.

Witnesses

Inventor
John C. Gebhart,
by
Attorney

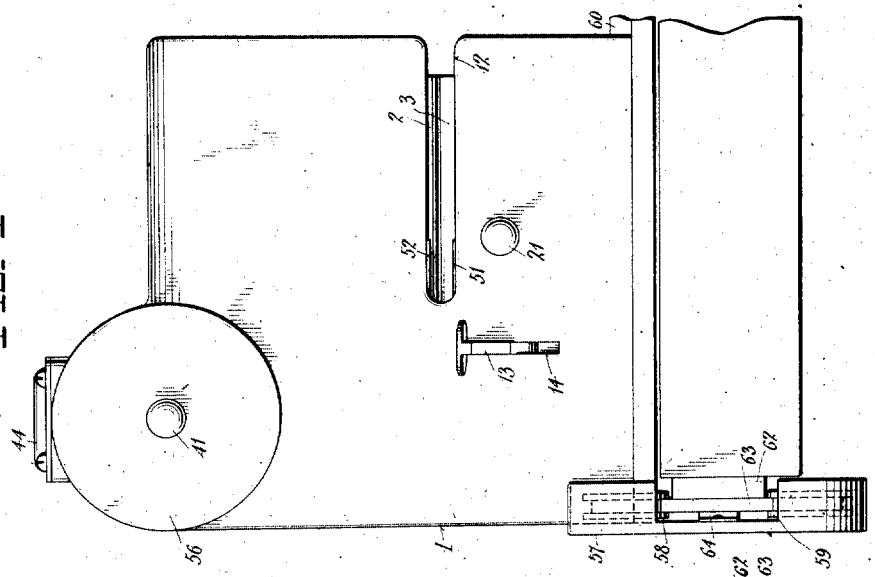

UNITED STATES PATENT OFFICE.

JOHN C. GEBHART, OF ST. LOUIS, MISSOURI, ASSIGNOR, BY MESNE ASSIGNMENTS, TO ECONOMETER COMPANY, OF ST. LOUIS, MISSOURI, A CORPORATION OF MISSOURI.

MACHINE FOR MEASURING TEXTILE FABRIC AND COMPUTING THE PRICE THEREOF.

1,250,843.     Specification of Letters Patent.     Patented Dec. 18, 1917.

Application filed March 17, 1916. Serial No. 84,899.

*To all whom it may concern:*

Be it known that I, JOHN C. GEBHART, a citizen of the United States, residing at St. Louis, in the State of Missouri, have invented new and useful Improvements in Machines for Measuring Textile Fabric and Computing the Price Thereof, of which the following is a specification.

This invention relates to an improved machine for measuring textile fabric and computing the price thereof. The invention proposes a machine of that type wherein the measuring and price computing operations are due to the movement of the cloth between rollers.

The objects of the invention, briefly stated, are to provide a machine of the character described which shall be exceedingly compact in its organization and may, therefore, be readily disposed at one side of the counter on which the goods are displayed, taking up the least possible amount of space on the counter and having an elevation above the counter best calculated to facilitate convenience of use; which will be absolutely exact and reliable in its work; wherein the measure and price of the goods may be determined by a glance at a single chart and without the transfer of the eye from one part to another and wherein the chart will be squarely in front of the operator and, hence, directly under her eyes as she bends forward to manipulate the fabric; which shall require very little power for its operation and, hence, is adapted to the measurement of exceedingly thin or filmy material, such as crêpe de chine, chiffon, net, or fine lace, without liability of injury thereto; and whose use requires the smallest possible number of the most simple manual operations.

The invention consists in certain features of structure, combination and relation which, together with the above and other objects and advantages, will appear as the description proceeds.

An embodiment of the invention is illustrated in the accompanying drawings, wherein:—

Figure 1 is a top plan view of a machine in which the features of the invention are incorporated;

Fig. 2 is a cross-sectional view on the line 2—2 of Fig. 1;

Fig. 4 is a side elevation;

Fig. 5 is a rear elevation;

Fig. 6 is a horizontal sectional view on the line 6—6 of Fig. 2;

Fig. 8 is a detail sectional view on the line 8—8 of Fig. 2.

Similar characters of reference designate corresponding parts throughout the several views.

Figure 3:
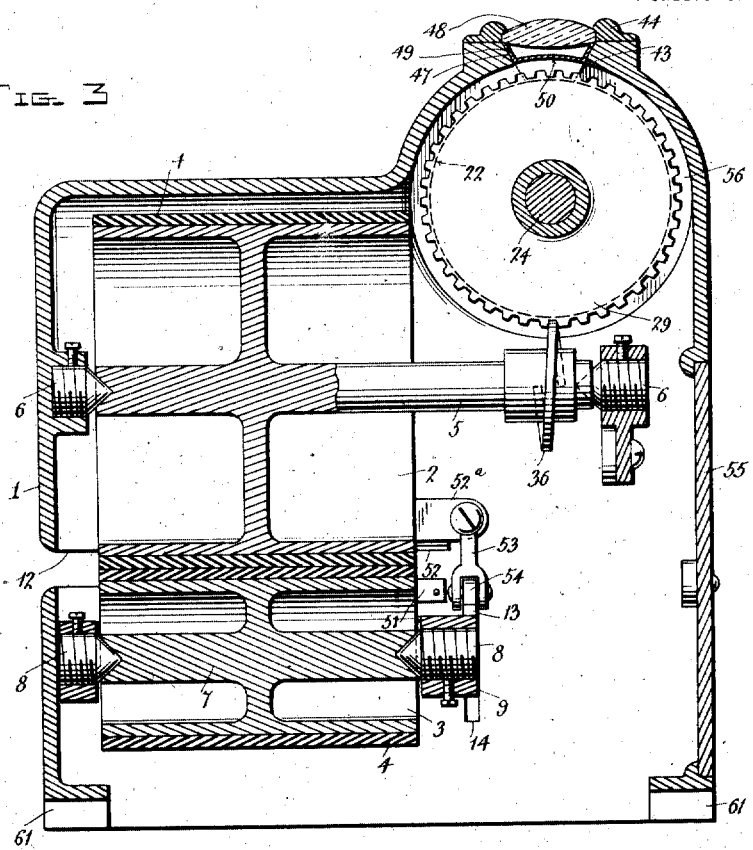
Fig. 3 is a central longitudinal sectional view.

The operative parts of the machine are housed in a casing 1 whose lower portion has a substantially rectangular horizontal section and incloses upper and lower rollers 2 and 3, whose parallel axes of rotation are located in the central longitudinal plane of the machine.

The operation of the machine is due to the rotation of the upper roller 2 which is, therefore, a power roller; and the roller 2 is rotated for this purpose by the passage between it and the roller 3 of the edge portion of the strip of fabric to be measured and sold. An advantage is secured in using the upper roller 2 as a power roller in that when the machine is set at a conveniently low elevation, the natural tendency is to pull upward on the goods which is being passed between the rollers 2 and 3 and the employment of the upper roller 2 as a power roll utilizes this tendency to promote the application of driving power.

The rollers 2 and 3 have their circumferential faces of suitable form to frictionally engage the fabric drawn between them, and for this purpose, it is preferred to provide the metal body parts of the said rollers with soft rubber facings 4.

The roller 2 is mounted on or formed in one with a horizontal shaft 5 which is disposed in the central longitudinal plane of the machine and has its ends supported by fixed bearings 6. The roller 3 is mounted on or formed in one with a shaft 7 arranged under and parallel to the shaft 5; and in order that the rollers may be spaced, at times, to provide for the introduction between them of the edge portion of the strip to be measured, the bearings 8 for the ends of the shaft 7 are carried by a vertically movable yoke 9 (Fig. 2). The side bars of the yoke are pivotally mounted at their inner ends on a tranverse bar 10 supported by the adjacent walls of the casing 1; and the yoke 9 (and therewith the roller 3) is urged upward by torsion springs 11 (Fig. 6) arranged concentrically to the bar 10. The springs 11 thus serve to hold the roller 3 against the roller 2 and to provide for such yielding of the roller 3 relatively to the roller 2 as may be necessary to compensate for variations in the thickness of the fabric passed through the machine.

The casing 1 is provided in its front and side walls with a slot 12 of suitable extent through which the fabric to be engaged between the rolls 2 and 3 is introduced.

In order to space the roller 3 from the roller 2 and thereby to enable the edge portion of the fabric to be placed between said rollers, the yoke 9 has a handle 13 which projects through a vertical slot 14 (Fig. 4) in the side wall of the casing 1 opposite to the side wall adjacent which the yoke 9 is pivoted and by which said yoke (and therewith the roller 3) is depressed. In order to hold the yoke 9 in its depressed position, the front cross-bar of said yoke is provided with a cam-faced lug 15 (Fig. 6) which co-operates with a detent 16 pivoted between its ends as at 17 to a lug projecting from the adjacent wall of the casing 1. The detent 16 is acted on by a spring 19 and its end, opposite that which is engaged by said spring, is formed as a shoulder 20 to engage against the adjacent wall of the casing 1 and thus limit the projection of the detent 16 by the spring 19. The shoulder 20 is provided with a headed operating pin 21 which projects through the adjacent side wall of the casing 1 and is disposed externally of the casing at the same side thereof as the handle 13. The pin 21 is located under the slot 12 and between the front of the casing 1 and the handle 13. By virtue of this arrangement, said pin may be readily operated, i. e., pushed inwardly to disengage the detent from the lug 15, in connection with the act of introducing the marginal portion of the fabric to be measured between the rollers 2 and 3.

The measured length and price indicating means consists, in its broad aspect, (i. e. as an element, broadly, of certain novel combinations of structural features which the invention presents), of a price value chart having combined therewith a length indicating scale and a bar bearing numerals indicative of the price per yard, the chart and the bar being relatively movable.

Important features of the invention are the arrangement of the chart to project to an elevation above the upper roller and symmetrically to the central longitudinal plane of the machine; and the arrangement of the means for operating the measured length and price indicating means above the pass of the rollers. These features insure that the machine shall take up the least possible space on the counter and shall be generally compact; and that the chart shall be presented squarely in front of the operator (who stands at the rear of the machine) and directly under her eyes, as she bends forward to manipulate the fabric.

In the embodiment preferred, the price value chart is in the form of a transversely disposed horizontal cylinder. As disclosed, said cylindrical chart is composed of two parts which are carried by two transversely disposed drum elements 22 and 23 located at one side of the roller 2 and preferably projecting to an elevation above said roller. These drum elements are driven from a single shaft and rotate as one. In functional effect, therefore, they constitute a single drum which, as shown, immediately adjoins the upper or power roller in the rear thereof.

The casing 1, viewed from the rear, as in Fig. 5, has the form of a T, its upper portion, at the rear of said casing, being specially formed to house the said drum elements 22 and 23 and the parts appurtenant thereto.

The drum elements 22 and 23 are fast on a common shaft 24 which extends transversely of the casing and is supported at its ends by bearings 25 and 26, in turn carried by brackets 27. The drum elements 22 and 23 are spaced from one another as at 28 and the space 28 is, for the most part, occupied by a worm wheel 29 loosely mounted on the shaft 24 and confined between a collar 30 on said shaft and the hub of the drum element 3. This arrangement, by which the worm wheel 29 is disposed in the central longitudinal plane of the machine, promotes compactness of organization. The drum elements 22 and 23, it will be noted, are arranged symmetrically to the central longitudinal plane of the machine in which the worm wheel is disposed. The worm wheel 29 is formed at one side thereof with a rib 31 which constitutes a clutch member and provides a seating for a companion cone clutch member 32. The clutch member 32 is rotatable with the shaft 24, for this purpose having its hub provided with a transverse pin 33 which projects through a short slot 34 in said shaft. The engagement of the clutch member 32 with the clutch member 31 is maintained by an expansive coil spring 35 interposed between the hubs of the drum element 22 and the clutch member 32. The worm wheel 29 is driven by a worm 36 mounted on the shaft 5 of the roller 2; and when the clutch member 32 is engaged with the clutch member 31, the worm wheel 29 will operate the shaft 24 and therewith the drum 22—23.

The drum 22 and 23 is reset after each operation of the machine by a spring 37 preferably a flat coil spring arranged adjacent the outer end of the drum element 22 and having one end secured to the bracket 27 and its other end secured to a lug 38 (Fig. 2) projecting inwardly from the inner circumferential face of said drum element. The lug 38 coöperates with a lug 39 on the adjacent bracket 27 to limit the zero-setting or return movement of the drum 22 and 23. The disengagement of the clutch members 31 and 32 is a prerequisite of the zero-setting of the drum and to effect such disengagement a stem 40 is slidably fitted in bores of the shaft 24 and the bearing 26, said stem having its inner end engaged against the pin 33 and its outer end projected beyond the casing 1 and provided with a head or fingerpiece 41. Obviously, by pushing the stem 40 inward, the clutch member 32 is disengaged from the clutch member 31 and thereupon the shaft 24 may rotate freely relatively to the worm wheel 29 and with the drum 22 and 23 as the latter is returned to zero position by the spring 37.

The drum elements 22 and 23 carry measurement and price value charts 42 and 42$^a$, the latter being a continuation of the former. The chart 42 has along its outer edge a circumferential scale 42$^b$ provided with numerals 42$^c$ representing length-unit values, e. g. yards, this scale being sub-divided into fractions of yards—e. g., eighths, quarters and halves. The present machine is especially designed for the measurement of goods sold by the piece i. e., for use in connection with retail sales, and for such use, it will have a capacity of approximately twelve yards. The numerals 42$^c$ will, therefore, be 1-12. The charts 42 and 42$^a$ are provided with squares arranged in circumferential rows and in longitudinal alinement with the gradations of the scale 42$^b$, these squares containing numerals 42$^d$ which are the respective products of the numerical values of the scale 42$^b$ multiplied by numerals representing prices per yard. The squares containing the numerals 42$^d$ are in circumferential alinement with the squares of an indicator bar 43 arranged in fixed relation adjacent the rear edge of a frame 44 set into the top of the casing 1 and through which the charts are exposed to view. The squares of the indicator bar 43 contain numerals indicative of the prices per yard at which the various fabrics may be sold. It will be understood that in the operation of the machine a continuous indication of the amount of goods passed is given by the adjacency of one of the numerals 42$^c$ or a numerical value graduation of the scale 42$^b$ to the bar 43; and the selling price of the goods passed through the machine may be instantly determined by reference to that numeral 42$^d$ which adjoins the bar 43 and is in peripheral alinement with the numeral on the bar 43 representing the price per yard of the goods being sold and in longitudinal alinement with the numeral 42$^c$ or numerical value graduation of the scale 42$^b$ then indicative of the length of goods passed. To illustrate: If the purchaser requests four yards of goods, the passage of four yards of goods between the rollers 2 and 3 will be indicated by the adjacency of the numeral 4 of the series 42$^c$ to the bar 43, as shown in Fig. 1, and the price of the four yards of goods so indicated will be shown in the square of the chart 42 or 42$^a$ which adjoins the bar 43 and peripherally alines with the numeral of said bar indicative of the price per yard. Thus, if the material sold is priced at ten cents per yard, the total price of the material, forty cents, can be instantly ascertained by a reference to the numeral of the series 42$^d$ in that square of the chart 42 which alines with the numeral 4 of the series 42$^c$ and with the numeral 10 of the chart 43, such square, as shown in Fig. 1, containing the numeral 40 of the series 42$^d$.

It is desirable that the charts 42 and 42$^a$ shall be removably fitted upon the drum 22 and 23, and for this purpose, each of the drum elements is provided, as shown in Fig. 8, with a longitudinal rib 45 having a T-shaped cross-section and over which is fitted a clip 46 whose terminal edges have biting engagement with the marginal portions of the chart which project under the overhanging head of the rib 45. The ribs 45 will, of course, be in mutual longitudinal alinement.

The frame 44 registers with a slot 47 formed in the top of the casing 1 above the drum 22 and 23 and said frame incloses a suitable magnifying glass or lens 48 which facilitates the reading of the numbers on the charts. Within the slot 47 there is set a rectangular frame 49 having its exposed faces finished with black enamel and whose principal function is to set off the numerals of the charts exposed to view through the slot 47 and the frame 44. The frame 49 has a cross-bar 50 which fits over and conceals the projecting peripheral portion of the worm wheel 29.

Figure 7:
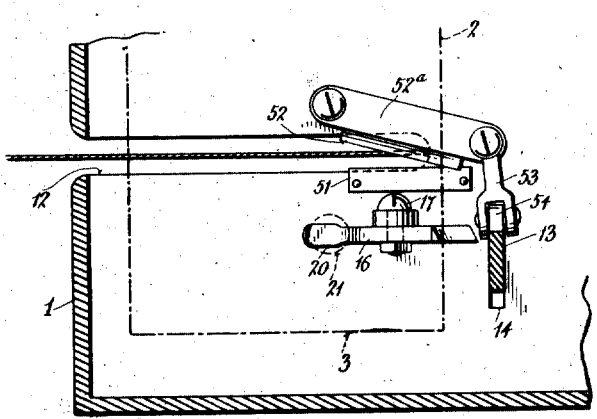
Fig. 7 is a detail sectional view on the line 7—7 of Fig. 2.

The machine includes a means for notching the margin of the strip of material being measured upon the completion of the measuring operation, for the purpose of indicating the line along which the measured strip is to be ripped or cut from the rest of the goods. This means consists of a knife which, according to the present invention, is combined in novel manner with the yoke or carrier for the roller 3 and is operated by the downward movement of said yoke. The knife in question is shown in Fig. 7 and has a stationary blade 51 and a blade 52 mounted on a pivoted arm 52ª. The blade 51 is secured to that side wall of the casing 1 from which the strip of material is drawn and adjoins the lower edge of the slot 12. The arm 52ª is pivoted at one end thereof above the upper edge of said slot and its other end is connected by a link 53 to a lug 54 formed on one of the side bars of the yoke 9 or on the handle 13, the pivotal connection between the link 53 and the lug 54 being somewhat loose.

In operation, the yoke 9 is first depressed to permit of the introduction of the material between the rollers 2 and 3, and to cause the blade 52 to extend across the slot 12 and prevent the front edge of the strip of material from being inserted through said slot. The strip of material from which a measured length is to be sold is then inserted through the slot 12 in a direction transverse to the machine as far as permitted by the lowered blade 52 and thereupon the detent 16 is operated to disengage the lug 15 and the yoke 9 is raised to throw the roller 3 against the roller 2. At such time, the blade 52 clears the slot 12 to enable the passage of the material therethrough. The clerk, who as above stated, stands at the rear of the machine, then draws the material through the slot 12 until the length of material requested has been measured, as shown by the adjacency of one of the numerals 42ᶜ, or one of the graduations of the scale 42ᵇ to the bar 43. Thereupon, the operation of the machine is stopped and the yoke 9 is depressed to space the roller 3 from the roller 2 and to prepare the machine for another operation. As the yoke 9 is depressed, the blade 52 moves across the slot 12, slitting the marginal portion of the material. The material is now withdrawn from the machine and the slit in the marginal portion thereof indicates the line along which the measured length is to be ripped or cut.

An advantage is secured by pivoting the arm 52ª at a fixed point above the blade 51 in that the blade 52 has a downward operative stroke and its cutting operation is commenced at a point most distant from its fixed pivot and immediately with the downward movement of the roller and progresses in a direction approaching its fixed pivot. In this way, the slit is cut cleanly and along a straight line.

By virtue of the novel features of organization above pointed out, the roller 2 may be made of relatively large diameter without detracting from the compactness of the machine; and the blades 51 and 52 may be relatively short, so as not to project beyond the ends of the rollers and, together with the detent 16, may be set closely in front of the rollers. As shown, the knife 51—52 and the detent 16 are substantially overhung by the roller 2.

To provide for access to the mechanism of the machine for the purposes of lubricating the parts or of adjusting bearings the rear wall of the casing 1 is provided with a removable panel 55 and that portion of the casing which incloses the drum 22 23 is provided with removable end heads 56 (Fig. 5).

Owing to the compactness and lightness of the machine, it may be readily moved from one part of the counter to another. To facilitate such movement of the machine, it is proposed to mount it on a carrier which may be moved for any desired distance along the counter. The carrier is shown in detail in Figs. 4 and 5 and consists of a triangular plate 57 provided with a pair of upper grooved rollers 58 and a single lower grooved roller 59; and with a laterally extending bar 60 having a dove-tail cross-section for engagement in dove-tail recesses 61 formed in the lower edges of the front and rear walls of the casing 1, as shown more particularly in Figs. 2 and 3. The rear face of the counter has attached thereto a suitable track which comprises an inner bar 62 and an outer bar 63 whose marginal portions project above and below the bar 62 and engage in the grooves of the rollers 58 and 59. The carrier 57 may be readily moved along the bar 63 to any desired part of the counter, but in order to prevent too free a movement of the machine along the track the carrier 57 may be, and preferably is, provided with a bow spring 64 which engages the outer face of the bar 63 with suitable braking pressure. When the use of the machine is not required or when for any other reason it is desired to remove the machine from the counter or from the carrier 57, the machine may be readily disengaged from said carrier by sliding it lengthwise of the bar 60 until said bar has passed from the recesses 61.

The worm 36 and worm wheel 29 constitute a direct drive between the roller 2 and the drum 22—23 and enable the operative rotation of said drum to be effected by the application of very slight power to the roller 2. The reduction of the power required for operation is also promoted by the special form of the bearings for the several shafts, 5, 7, and 24, cone bearings, as shown, being preferred. By virtue of the very slight degree of power required, the machine may be operated by exceedingly thin or filmy fabric, such as crêpe de chine, chiffon, net or fine lace without any liability of injury to such fabric in consequence of its use for the operation of the roller 2.

As above stated, the drawings assume a machine having a measuring capacity of twelve yards. The direct drive between the roller 2 and the drum 22—23 necessitates an even ratio between the gear elements which constitute the driving connections of the drum. It is to be noted, however, that the worm wheel 29 will have a greater number of teeth than the number of revolutions of the roller 2 required to pass the maximum length of material, twelve yards, for which the present machine is adapted. The excess teeth on the worm wheel 29 will be provided to compensate for any space about the peripheries of the drum 22—23 which may be taken up by the ribs 45 and adjacent blank portions of the charts 42 and 42ª.

I claim—

1. In a machine of the class described, in combination, upper and lower rollers, price computing means including a movable element, means for operating the movable element from the upper roller, a depressible carrier for the lower roller spring urged to hold the lower roller against the upper roller, said carrier having an operating handle, a detent engaging an element of said carrier on the downward movement thereof to hold said carrier in its depressed position, and a pin operable by an inward movement to disengage said detent from said carrier, said pin being located below the pass of the rollers at the same side of the machine as said handle and between said handle and that end of the machine through which the fabric is inserted between the rollers.

2. In a machine of the class described, in combination, upper and lower rollers, price computing means including a movable element, means for operating the movable element from the upper roller, a pivoted yoke having its side bars provided with bearings for the shaft of the lower roller, springs urging said yoke upward to hold the lower roller against the upper roller, a handle for operating said yoke extending from the front or free end thereof, and a detent arranged to engage a part of the yoke to hold the latter depressed and provided with a pin located at the same side of the machine as the handle and by which it may be operated to disengage the yoke.

3. In a machine of the class described, in combination, upper and lower rollers, price computing means including a movable element, means for operating the movable element from the upper roller, a depressible carrier for the lower roller spring urged to hold the lower roller against the upper roller, said carrier having an operating handle, a detent engaging an element of said carrier on the downward movement thereof to hold said carrier in its depressed position, and a device operable in connection with the insertion of the fabric between the rollers when the latter are spaced for operating the detent to disengage said carrier.

4. In a machine of the class described, in combination, upper and lower rollers, price computing means including a movable element, means for operating the movable element from the upper roller, a pivoted yoke having its side bars provided with bearings for the shaft of the lower roller and having an operating handle at a distance from its pivot, said yoke having a cam-faced lug at its front or free end and a spring-pressed pivoted detent for engagement with said lug, said detent having a shoulder beyond its pivot to limit its movement by its spring and having a pin projecting from said shoulder whereby it may be operated to disengage said yoke.

5. In a machine of the class described, in combination, upper and lower rollers, price computing means including a movable element, means for operating the movable element from the upper roller, a depressible carrier for the lower roller spring urged to hold the lower roller against the upper roller, said carrier having an operating handle, a knife located in front of said rollers and including an arm having one end pivoted at a fixed point above the pass of the rollers, a straight blade carried by said arm and a link connecting the other end of said arm and said handle whereby the blade is operated by the downward movement of the handle to depress the carrier, the blade being arranged between the fixed pivotal point of said arm and said link.

6. In a machine of the class described, in combination, upper and lower rollers whose parallel axes of rotation are located in the central longitudinal plane of the machine, length measuring and price computing means including a combined length measuring and price computing chart projecting to an elevation above the upper roller and arranged symmetrically of the central longitudinal plane of the machine, and an element co-acting with said chart to separately indicate thereon measured length and price, said chart and said element being relatively movable in the operation of the machine, and means for operating the movable element of the length measuring and price computing means from the upper roller, said operating means being arranged above the pass of the rollers.

7. In a machine of the class described, in combination, upper and lower rollers, price computing means including a movable element, means for operating the movable element from the upper roller, a depressible carrier for the lower roller spring urged to hold the lower roller against the upper roller, said carrier having an operating handle, a knife located in front of said rollers and including a movable arm provided with a blade and a connection between said arm and said handle whereby the blade is operated by the downward movement of the handle to depress the carrier.

8. In a machine of the class described, in combination, upper and lower rollers, price computing means including a drum and a shaft on which the drum is fast, a gear wheel loose on the shaft, means for operating said gear wheel from one of said rollers, clutch means for operatively connecting the gear wheel and the drum and including a clutch element rotatable with said shaft and movable toward and away from the gear wheel, said shaft having a bore extending from an end thereof, and a stem slidably fitted in said bore for operating said movable clutch element to disconnect said gear wheel and said drum.

9. In a machine of the class described, in combination, upper and lower rollers, price computing means including a drum and a shaft on which the drum is fast, a gear wheel loosely mounted on the shaft, the gear wheel having a clutch element formed therewith at one side thereof, a second clutch element rotatable with the shaft and slidable toward and away from the gear wheel, said shaft having a bore extending from an end thereof, and a stem slidably fitted in said bore for operating said movable clutch element to disconnect said gear wheel and said drum.

10. In a machine of the class described, in combination, upper and lower rollers, price computing means including a transverse drum and a shaft on which the drum is fast, a worm wheel loose on the shaft, the shaft of the upper roller having a rearward extension and said drum carrying shaft being located above said extension, a worm on said extension gearing with said worm wheel, clutch means for operatively connecting the worm wheel and the drum and including a clutch element rotatable with the drum carrying shaft and movable toward and away from the worm wheel, said drum carrying shaft having a bore extending from an end thereof, and a stem slidably fitted in said bore for operating said movable clutch element to disconnect said worm wheel and said drum.

11. In a machine of the class described, in combination, upper and lower rollers, price computing means including a pair of spaced alining drum elements and a shaft on which the drum elements are mounted, and gearing for driving the drum elements from the shaft of the upper roller including a gear wheel arranged on the drum-carrying shaft in the space between the drum elements.

12. In a machine of the class described, in combination, upper and lower rollers whose parallel axes of rotation are located in the central longitudinal plane of the machine, the shaft of the upper roller being extended rearwardly, a horizontal drum mounted in the rear of the upper roller above the rearward extension of its shaft, said drum being transversely disposed symmetrically of the central longitudinal plane of the machine, a combined length measuring and price computing chart circumscribing said drum, a stationary element co-acting with said chart to separately indicate thereon measured length and price, and gearing between the rearwardly extended portion of said shaft and said drum to drive the latter.

13. In a machine of the class described, in combination, upper and lower rollers whose parallel axes of rotation are located in the central longitudinal plane of the machine, the shaft of the upper roller being extended rearwardly, a horizontal drum mounted in the rear of the upper roller above the rearward extension of its shaft, a shaft on which the drum is mounted, said drum being transversely disposed symmetrically of the central longitudinal plane of the machine, gearing between the rearwardly extended portion of said shaft and the drum including a gear wheel loose on the drum carrying shaft, a spring pressed clutch element co-acting with said gear wheel and rotatable with said drum-carrying shaft and a slidably mounted pin for moving said clutch element against the pressure of its spring to effect its disengagement from said gear wheel.

14. In a machine of the type set forth, in combination, upper and lower rollers, the upper roller being a power roller and having its shaft provided with a rearward extension, a transverse shaft located above said rearward extension, gearing between said extension and said transverse shaft for driving the latter, a normally engaged clutch for controlling the operation of said transverse shaft, means for operating said clutch to render said gearing inoperative and a drum fast on said transverse shaft and immediately adjoining said power roller in the rear thereof.

15. In a machine of the type set forth, in combination, upper and lower rollers, the upper roller being a power roller and having its shaft provided with a rearward extension, a transverse drum located above said extension and immediately adjoining said power roller in the rear thereof, gearing for driving said drum from said extension including a normally engaged clutch for controlling the operation of said drum, and means for operating said clutch to render said gearing inoperative.

In testimony whereof I have hereunto set my hand in presence of two subscribing witnesses.

JOHN C. GEBHART.

Witnesses:
CHAS. S. HYER,
JOHN S. POWERS.